United States Patent Office

3,420,784
Patented Jan. 7, 1969

3,420,784
SILVER AND SILVER-CONTAINING COPPER-CADMIUM OXIDE-ZINC OXIDE-BARIUM OXIDE CATALYSTS
Carl D. Keith, Summit, Saul G. Hindin, Mendham, and Ludwig A. Galen, East Orange, N.J., assignors to Engelhard Industries, Inc., Newark, N.J., a corporation of Delaware
No Drawing. Filed Jan. 13, 1966, Ser. No. 520,362
U.S. Cl. 252—475      11 Claims
Int. Cl. B01j *11/00*

ABSTRACT OF THE DISCLOSURE

Supported silver catalysts are prepared by mechanically depositing on spherical inorganic carriers a dry finely divided silver powder which has a surface area of 3–30 $m.^2/g$.

---

This invention relates to silver catalysts and, more particularly, to supported silver catalysts of improved stability and resistance to dusting which are effective in the vapor-phase oxidation of ethylene to ethylene oxide.

Silver catalysts are well known and, in accordance with commercial practice, silver is the preferred catalyst for oxidizing ethylene to ethylene oxide.

Heretofore, silver catalysts have been prepared in a variety of ways. The earliest silver catalysts for ethylene oxide synthesis consisted of unsupported metallic silver. Subsequent work was directed to development of a supported silver catalyst, e.g. silver on metallic or inert carriers. However, a continuing problem faced by the art was the ability of the silver powder to adhere to the supports, since dusting due to poor adhesion results in loss of activity and undesirable increases in the pressure drop through tubular reactors normally employed for ethylene oxidation. Subsequent research has indicated that the best procedure for obtaining a suitable catalyst was to apply the silver or silver compounds to the carriers by means of a slurry or to deposit the silver by "in-situ" precipitation from a solution or slurry. Alkaline earth compounds can be added to serve as a binder or promoter.

It has now been discovered, in accordance with this invention, that the difficulties incidental to the preparation of suitable supported silver catalysts, both promoted and unpromoted, can be overcome by mechanically depositing finely divided silver of particular particle size directly on the carrier by simply rolling or tumbling the carrier in the dry silver powder. The carriers may be sprayed with a small amount of water, but only so much as can be absorbed by the carriers. In contrast to U.S. 2,920,052, in no case is the water added in excess of the water absorption value for the supports. Generally, the amount of water used is less than 10% and preferably less than 7% of the weight of the carrier. The amount of water which may be used will vary with the water absorption and porosity of the carrier and the temperature and humidity of the atmosphere, etc. For carriers having an $H_2O$ absoption of about 15–20%, it was found that the $H_2O$ added should be less than 50% of the water absorptivity. Otherwise, the pick-up of silver by the carriers was poor.

The catalysts prepared in accordance with this invention have superior adhesion characteristics, show exceptionally good activity and selectivity and are essentially free of dusting. Further, it has been found that catalysts prepared in this way are electrically conductive when made and after use in tests for the production of ethylene oxide. The electrical conductivity indicates that there is a continuous layer of metallic silver which accounts for the good thermal conductivity. Good heat transfer is essential to avoid hot spots in the bed which contribute to the loss of catalyst selectivity and diminish the catalyst life.

The silver powder which is employed in preparing the catalysts of the present invention consists of dry silver powder having a surface area of 3 to 30 $m.^2/g$. and a particle size 100% (by weight) below 50 microns, and at least 65% below 10 microns. Such finely divided silver can be prepared in a number of ways. We prefer to prepare the silver powder by slow addition of aqueous caustic to a solution of a silver salt and sugar, e.g. d-glucose. Other reducing sugars can be employed.

In the preparation of silver catalysts for ethylene oxidation to ethylene oxide, the use of various metal and metal compound promoters is well known. We have found that a particularly effective catalyst can be prepared by incorporating minor amounts of copper, e.g. from 0.01 to about 3% by weight based on the final weight of catalyst in the finely divided silver, preferably by co-precipitating the copper with the silver from aqueous sugar solutions. Various promoters may be added, e.g. metal oxides such as barium oxide, zinc oxide, cadmium oxide and the like. Generally, such metal oxide promoters are present in an amount up to about 2% by weight based on the weight of catalyst, and may be added to the dry silver powder prior to depositing the latter on the support.

In order to further promote the silver catalyst, the finely divided silver can be treated with dilute nitric acid, preferably of 1–5% concentration, to etch the silver powder.

In the preparation of the catalyst of this invention, the dry finely divided silver powder, with or without added promoters, is tumbled or rolled with a carrier, preferably in the form of spheres, to mechanically bond the powder to the carrier. The mechanical action on the dry silver powder is just sufficient to weld silver particles together to give an electrically conductive catalyst without losing the desired superficial surface area. The carrier should be inert and, preferably, be substantially free of small pores. Carriers having desirable characteristics for the present use are well known in the art, e.g. refractory inorganic materials such as zirconia, fused alumina, mulite, magnesia, silicon carbide and beryllium porcelain in the form of spheres of 0.1–0.5 inch diameter. A particularly good carrier is spherical Alundum, containing about 87% (by weight) $Al_2O_3$, 11.65% $SiO_2$ and trace quantities of various metal oxides, principally $Fe_2O_3$ and $TiO_2$. This material is commercially available in the form of irregular spheres of about ¼-inch diameter having the following physical properties:

| | | |
|---|---|---|
| Apparent porosity | percent | 36–40 |
| $H_2O$ absorption | do | 15–19 |
| Bulk density | g./cc. | 2.1–2.3 |
| Apparent spec. gr. | g./cc. | 3.4–3.6 |
| Surface area | $m.^2/g$. | <1 |
| Pore diam. range (90% vol.) | microns | 2–4 |

In depositing the silver powder on the support, the powder and carrier are charged to conventional rolling or tumbling apparatus and agitated for a sufficient period of time, generally from 10 minutes to 4 hours, depending on the particular equipment employed, to adhere all or most of the silver powder to support. It has been found that if thoroughly dry silver powder is employed, substantially all of the powder is picked up by the spheres. Sufficient silver powder is employed to provide a finished catalyst containing from 5–20%, preferably 10–15% silver, based on the weight of catalyst.

The supported catalyst prepared by depositing silver powder on the carrier may be finally treated in a number of fashions. For example, it may be used as prepared, it may be treated with an $O_2$-containing gas at elevated temperature, or it may be subjected to a cyclic treatment with a hydrogen-containing gas and an oxygen-containing gas. For example, the catalyst may be first treated with flowing hydrogen-containing gas, e.g., with a pure hydrogen or a hydrogen-nitrogen stream at about 100–140° C., for a period of about ¼ to 8 hours, followed by a subsequent treatment with an oxygen-containing stream, e.g., air or pure oxygen at about 100–270° C., for a period of about ¼ to 8 hours at an hourly space velocity (VHSV) of about 10 or higher. Alternatively, the catalyst may first be treated with the oxygen-containing stream and then the hydrogen-containing stream. Caution should be used to flush with nitrogen when there is the possibility that in going from one gas mixture to the other, a gas composition may form in the explosive limit, e.g., where pure $H_2$ and pure $O_2$ are used. Annealing gas and air are the preferred hydrogen- and oxygen-containing streams for the cyclic treatment of the catalyst both because the explosion hazard is avoided and for economic reasons. In the preferred treatment, a gas mixture in the explosive range cannot be formed and it is not necessary to flush with nitrogen.

The following examples represent specific embodiments of the invention. In the tables, Percent conversion $$=\frac{\text{percent } C_2H_4 \text{ (feed)} - \text{percent } C_2H_4 \text{ (effluent)}}{\text{percent } C_2H_4 \text{ (feed)}} \times 100$$

Percent selectivity $$=\frac{\text{percent } C_2H_4O \text{ (effluent)}}{\text{percent } C_2H_4 \text{ (feed)} - \text{percent } C_2H_4 \text{ (effluent)}} \times 100$$

$$\text{Percent yield} = \frac{\text{percent } C_2H_4O \text{ (effluent)}}{\text{percent } C_2H_4 \text{ (feed)}} \times 100$$

EXAMPLE 1

To a solution containing 142 g. of $AgNO_3$ and 2.14 g. of $Cu(NO_3)_2 \cdot 3H_2O$ in 1.8 liters of water was added a solution of 18 g. d-glucose in 72 ml. of water. While maintaining the temperature of the silver solution below 30° C., i.e., at about 22–24° C., a solution of 100 g. KOH in 100 ml. of water was added slowly. The resulting precipitate was washed to neutrality and free of potassium ions, and the washed precipitate dried in air at 115° C.

The precipitated silver had a surface area of about 7 m.²/g. determined by BET method, and the following particle distribution (by weight)

| Percent: | Microns |
| --- | --- |
| 80 | 1–10 |
| 10 | Below 1 |
| 10 | 10–50 |
| 100 | Below 50 |

20 g. of this finely divided silver was mixed with 2 g. of finely powdered $Ba(OH)_2 \cdot 8H_2O$, and about one-half of the mixture placed in a vessel with 150 g. of 5/16-inch diameter Alundum spheres. The vessel was fitted on a rotating table and tumbled slowly for about ¾-hour. The remainder of the mixture was then added to the vessel and tumbled for a further ¾-hour, at which time substantially all of the silver powder adhered to the carrier.

The resultant catalyst contained about 10% by weight silver, .06% Cu and 0.4% BaO and exhibited excellent adhesion. The catalyst was tested for ethylene conversion and selectivity as follows:

A gas mixture containing, by volume

| $C_2H_4$ | percent | 5.0 |
| --- | --- | --- |
| $O_2$ | do | 6.0 |
| $CO_2$ | do | 6.0 |
| $C_2H_6$ | do | 0.5 |
| $C_2H_4Cl_2$ | p.p.m | 0–3 |
| $N_2$ | | Balance | was fed to a tubular reactor containing 47 ml. catalyst at atmospheric pressure and temperature of 230–280° C. The volume hourly space velocity (VHSV) was 520, and the contact time with the catalyst was 3.0 seconds. At various intervals on stream, the effluent was analyzed by I.R. for ethylene and ethylene oxide content. The conversion, selectivity and yield are given in Table I.

TABLE I

| Running time (hours) | $C_2H_4Cl_2$ (p.p.m.) | Conversion (percent) | Selectivity (percent) | Yield (percent) |
| --- | --- | --- | --- | --- |
| 18 | 0 | 66 | 52 | 34 |
| 21.5 | 1 | 66 | 48 | 32 |
| 45 | 0 | 66 | 48 | 31 |

EXAMPLE 2

A supported silver catalyst was prepared following the procedure of Example 1, except that the supported catalyst was given an activation treatment prior to testing. The catalyst was placed in a tubular furnace and flushed with nitrogen, then heated to 110° C. and treated with flowing hydrogen for 1 hour, then flushed with nitrogen and treated with pure oxygen at a flow rate of 200 VHSV at 110° C. for 1 hour, and finally flushed with nitrogen before cooling. The catalyst was tested for ethylene oxidation in the absence of inhibitor and the results are given in Table II.

TABLE II

| Running time (hours) | Conversion (percent) | Selectivity (percent) | Yield (percent) |
| --- | --- | --- | --- |
| 17 | 66 | 55 | 36 |
| 22 | 62 | 53 | 33 |

EXAMPLE 3

An aqueous solution of 160 g. of silver nitrate and 2.5 g. copper nitrate trihydrate in 2.1 liters of deionized water was mixed with a solution of 21 g. of d-glucose in 81 ml. deionized water, and to this solution was added 225 g. of aqueous KOH (50% by weight) with vigorous stirring. The precipitate was washed repeatedly till free of potassium ion, then dried at 115° C.

To the finely divided silver containing a minor amount of copper, 5% zinc oxide powder was added. The powders were mixed manually and then rolled for 15 minutes in a dish rotating at 20 r.p.m. Eleven parts of this dry mixture was added to and rolled with 100 parts of ¼″-diameter Alundum spheres for 3 hours at 20 r.p.m.

The catalyst containing 9.5% Ag, 0.5% ZnO, 0.06% Cu on Alundum spheres showed excellent adherence of the metal on the spheres.

The coated spheres were heat treated at 250° C. for 2 hours with flowing air at an hourly space velocity (VHSV) of 100 to 200.

The catalyst was then tested for the production of ethylene oxide from ethylene by the procedure described in Example 1, employing 2 p.p.m. $C_2H_4Cl_2$ in the feed gas mixture. The oxidation was effected at 250° C. and the results are given in Table III.

TABLE III

| Running time (hours) | Conversion (percent) | Selectivity (percent) | Yield (percent) |
| --- | --- | --- | --- |
| 43 | 71 | 51 | 36 |
| 46.5 | 71 | 54 | 38 |
| 138.5 | 72 | 50 | 36 |
| 142 | 71 | 51 | 36 |
| 144.5 | 70 | 52 | 36 |
| 163 | 71 | 51 | 36 |
| 187 | 69 | 53 | 37 |

The data show that the catalyst was exceptionally good for the oxidation of ethylene to ethylene oxide. The catalyst gave excellent yields which did not decrease over the test period of 187 hours. After 187 hours on stream, the catalyst was examined. The metal was not only very adherent to the carrier, but adhesion was improved relative to fresh catalyst.

EXAMPLE 4

A catalyst consisting of 9.5 weight percent Ag, 0.5% ZnO and 0.06% Cu on ¼-inch Alundum spheres was prepared and tested as described in Example 3. After 356 hours on stream at 250° C., the selectivity of the catalyst was 52% with no detectable fall off of selectivity during the test. At the completion of the run, the catalyst showed excellent adhesion of silver to the carrier.

EXAMPLE 5

A catalyst was prepared using the procedure of Example 3, except that CdO was substituted for the zinc oxide to provide a catalyst consisting of 9.5% Ag, 0.06% Cu and 0.5% CdO on 5/16-inch Alundum spheres. This catalyst showed an ethylene conversion of 57%, selectivity of 62% and ethylene oxide yield of 35% after 41 hours running time at 250° C.

EXAMPLE 6

A catalyst was prepared by a procedure similar to that described in Example 4, except that barium oxide powder was substituted for zinc oxide, and the final catalyst contained 10% Ag, 0.06% Cu and 0.5% BaO. This was similarly tested for ethylene oxidation capability in the absence of inhibitor. Results are shown in Table IV.

TABLE IV

| Running time (hours) | Conversion (percent) | Selectivity (percent) | Yield (percent) |
| --- | --- | --- | --- |
| 46 | 68 | 46 | 31 |
| 68 | 63 | 46 | 29 |
| 162 | 63 | 42 | 27 |
| 190 | 62 | 40 | 25 |

EXAMPLE 7

A catalyst containing about 9% Ag, 0.06% Cu and 0.5% BaO was prepared by a procedure similar to that described in Example 6 except that the support was sprinkled with about 5% water (based on the weight of catalyst) before rolling with the silver and barium oxide powders. The catalyst was given the following activation treatment prior to testing. It was first subjected to a stream of annealing gas, containing 7% $H_2$-93% $N_2$ at 120–130° C. for 1.5 hours at a volume hourly space velocity of 300, and then contacted with air at a temperature of 120–140° C. for 1.5 hours at a space velocity of 300. The results of a test for ethylene oxide production in the presence of 2 p.p.m. $C_2H_4Cl_2$ at about 250° C. are shown in Table V.

TABLE V

| Running time (hours) | Conversion (percent) | Selectivity (percent) | Yield (percent) |
| --- | --- | --- | --- |
| 43 | 72 | 52 | 37 |
| 143 | 66 | 53 | 35 |
| 165 | 67 | 55 | 37 |

EXAMPLE 8

A catalyst containing about 9% Ag-0.06% Cu-0.5% BaO on 3/16-inch Alundum spheres was prepared as described in Example 7. The catalyst was given the following activation treatment prior to testing. It was first heated in an air stream, at a VHSV of 300, at a temperature of 120–130° C. for 1.5 hours and then subjected to an annealing gas stream, containing 7% $H_2$-93% $N_2$, at a VHSV of 300 at 120–130° C. for 1.5 hours. The results of a test for ethylene oxide production in the presence of 2 p.p.m. $C_2H_4Cl_2$ at 250° C. are shown in Table VI.

TABLE VI

| Running time (hours) | Conversion (percent) | Selectivity (percent) | Yield (percent) |
| --- | --- | --- | --- |
| 43 | 72 | 57 | 41 |
| 68 | 69 | 57 | 39 |
| 138 | 70 | 56 | 39 |
| 236 | 68 | 54 | 37 |
| 308 | 66 | 56 | 37 |

EXAMPLE 9

39.5 g. of $AgNO_3$ were dissolved in 380 ml. of $H_2O$. To this solution, 0.62 g. of $Cu(NO_3)_2 \cdot 3H_2O$ was added and the resultant solution was diluted to about 500 ml. and cooled to about 30° C. A glucose solution consisting of 5.3 g. in 24 ml. of $H_2O$ was stirred into the silver solution over a 10 minute period, and while still stirring and maintaining the temperature at about 30° C., a solution of 40.4 g. of 50% aqueous NaOH to which was added 47 ml. of $H_2O$ was added over a period of 30 minutes. After addition of the NaOH solution stirring was continued for 15 minutes, while still maintaining the temperature at about 30° C. The resultant precipitate was pumped onto a filterstone, filtered using a filter paper on a porous filterstone, and washed with deionized water until the wash water had a resistance of 200,000 ohms. The silver powder was dried at 110° C. and then screened, using a 100-mesh screen.

After charging 181 g. of 5/16" Alundum spheres to a rotary blender, 3.6 g. of $H_2O$ were sprayed onto the spheres over a period of about 6 minutes while rotating the blender at 9½ r.p.m. During this time, the blender was operated intermittently to insure uniform spray and avoid wetting any surface.

A mixture containing 22.9 g. of silver powder and 1.26 g. of $Ba(OH)_2 \cdot 8H_2O$, which had been blended for 15 minutes, was added to the sprayed, rotating carriers. The rotating machine was operated at 9½ r.p.m. At this speed, the coating was accomplished in about 5 minutes.

The coated spheres were then heat treated in air at about 250° C. for about 8 hours. The resultant catalyst was analyzed and found to contain 10.02% Ag, 0.06% Cu, and 0.42% BaO. The results of a test for ethylene oxide production in the presence of 2 p.p.m. $C_2H_4Cl_2$ at 250° C. are shown in Table VII.

TABLE VII

| Running time (hours) | Conversion (percent) | Selectivity (percent) | Yield (percent) |
| --- | --- | --- | --- |
| 21 | 68 | 56 | 38 |
| 43 | 68 | 58 | 40 |
| 47 | 69 | 53 | 37 |
| 166 | 70 | 52 | 37 |
| 185 | 69 | 53 | 36 |
| 190 | 69 | 53 | 37 |
| 209 | 71 | 50 | 36 |

EXAMPLE 10

A supported silver catalyst was prepared using a similar procedure to that shown in Example 7, with the exception that before the finely divided silver was added to the carriers they were immersed in water and then drained. Specifically, 200 g. of 3/16-inch Alundum spheres, having a water absorption of 15–20% were immersed in water for a period of about 5 minutes and then carefully drained. The carriers were found to have picked up about 40 g. of $H_2O$. Thereafter, a powder containing 20 g. of Ag with a minor amount of Cu and 1 g. of BaO was rolled with the wetted carriers using the procedure described above. The carriers did not pick up the Ag readily, and it was found that only about 74% of the silver powder adhered to the carriers. The remainder of the silver remained in the rotary drum. The catalyst, which was wet and sticky, was placed in an oven at 115° C. to dry and then subjected to the cyclic activation treatment described in Example 8. Silver remained on the walls of the container. The resultant catalyst was analyzed and found to contain only 6.38% Ag. The catalyst was tested using the procedure previously described and it showed very poor activity.

What is claimed is:

1. A process for preparing a supported silver catalyst which process consists in mechanically agitating finely divided dry silver powder having a surface area of 3 to 30 m.²/g. with a refractory inorganic support material in the form of spheres having a diameter between about 0.1 and 0.5 inch for a period of time sufficient to adhere the silver powder to the support, and wherein the silver powder is employed in the amount between about 5 and about 20% by weight based on the weight of the catalyst.

2. Process of claim 1 wherein the silver powder has a particle size below 50 microns.

3. Process of claim 2 wherein the silver powder contains at least 65% by weight of particles less than 10 microns in size.

4. Process of claim 1 wherein the silver powder contains at least one metal oxide promoter, which is a member of the group consisting of cadmium oxide, zinc oxide and barium oxide, in an amount up to 2% by weight based on the weight of the catalyst.

5. Process of claim 1 wherein the catalyst contains from 0.01 to 3% by weight copper based on the weight of supported catalyst.

6. Process of claim 5 wherein the copper is incorporated in the catalyst during the preparation of the finely divided silver by coprecipitation from an aqueous solution containing silver and copper salts.

7. A process of claim 1 wherein the supported catalyst is activated by treatment with a flowing hydrogen-containing gas at a temperature between about 100 to 140° C. for a period of ¼ to 8 hours and with a flowing oxygen-containing gas at a temperature between 100° to 270° C. for a period of ¼ to 8 hours.

8. A process of claim 7 wherein the hydrogen-containing gas is annealing gas.

9. A process of claim 7 wherein the oxygen-containing gas is air.

10. A process of claim 7 wherein the catalyst is treated first with the hydrogen-containing gas and subsequently with the oxygen-containing gas.

11. A process of claim 7 wherein the catalyst is treated first with the oxygen-containing gas and subsequently with the hydrogen-containing gas.

References Cited

UNITED STATES PATENTS

| | | | |
|---|---|---|---|
| 2,424,085 | 7/1947 | Bergsteinsson et al. | 252—454 |
| 2,426,761 | 9/1947 | Cambron et al. | 252—476 |
| 2,763,696 | 9/1956 | Finch et al. | 252—477 |
| 2,769,016 | 10/1956 | Lichtenwalter et al. | 252—476 |

FOREIGN PATENTS 234,419    4/1959    Australia.

DANIEL E. WYMAN, *Primary Examiner.*

P. E. KONOPKA, *Assistant Examiner.*

U.S. Cl. X.R.

252—476, 477, 463, 454, 443, 430, 438, 461; 260—348.5